G. D. MINNICK.
RESILIENT WHEEL.
APPLICATION FILED MAY 1, 1912.
1,060,480.
Patented Apr. 29, 1913.
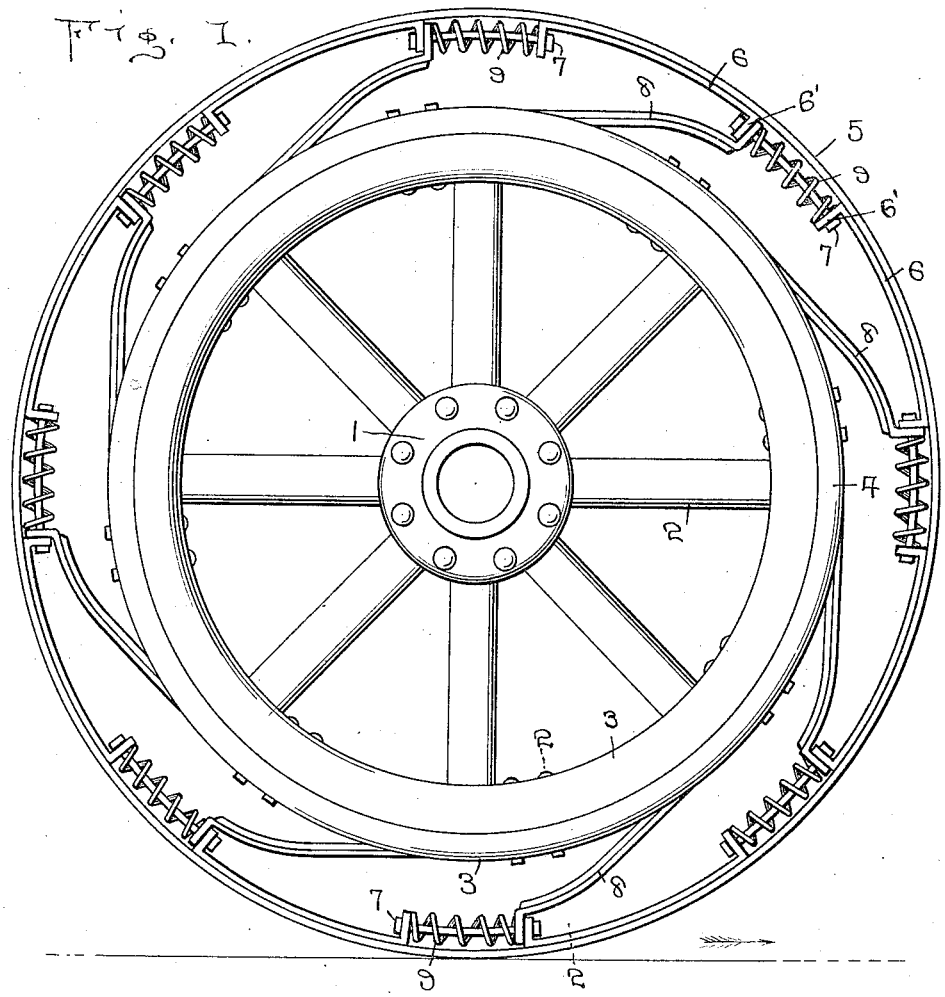
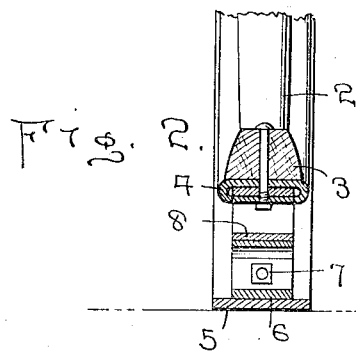
WITNESSES:
Thos. W. Riley
M. Newcomb
INVENTOR
G. D. Minnick
BY W. T. Fitzgerald & Co.,
Attorney

UNITED STATES PATENT OFFICE.

GEORGE D. MINNICK, OF RIVERTON, NEBRASKA.

RESILIENT WHEEL.

1,060,480.  Specification of Letters Patent.  Patented Apr. 29, 1913.

Application filed May 1, 1912. Serial No. 694,349.

*To all whom it may concern:*

Be it known that I, GEORGE D. MINNICK, a citizen of the United States, residing at Riverton, in the county of Franklin and State of Nebraska, have invented certain new and useful Improvements in Resilient Wheels; and I do hereby declare the following to be a full, clear, and exact description of the invention, such as will enable others skilled in the art to which it appertains to make and use the same.

My invention relates to new and useful improvements in resilient wheels and more particularly to wheels for vehicles having springs interposed between the rim and the tread.

The object of my invention is to provide an improved wheel having a resilient tread of cheap construction, which will do away with the necessity of employing rubber or pneumatic tires.

Other objects and advantages will be hereinafter set forth in the specification and pointed out in the claim.

In the accompanying drawings I have shown the preferred form which my invention may take.

In said drawings, Figure 1 is an elevation showing the preferred form of my improved wheel, and, Fig. 2 is a detail sectional view as seen on line 2—2, Fig. 1.

Referring to the drawings, in which similar reference numerals designate corresponding parts throughout the several views, I employ a wheel having a hub 1, spokes 2 and a felly 3 of the usual or any desired construction. The felly 3 is provided with a channeled rim 4, which may be similar to the channeled rim employed in connection with clencher tires.

The tread of my improved form of wheel preferably consists of a flexible metallic ring or tread band 5, which is of considerably greater diameter than the diameter of the felly of the wheel and arranged concentrically therewith. Rigidly secured to the tread 5 on the inner surface thereof are a plurality of arcuately formed strips 6, which have their ends bent inwardly or substantially radially of the wheel, so as to form lugs 6', and these lugs have apertures therethrough adapted to receive bolts 7. The bolts 7 extend through the lugs on the adjacent ends of the strips 6 for a purpose hereinafter more clearly set forth, and said bolts connect the lugs in pairs.

A plurality of leaf springs 8, each having one end secured in the channeled rim 4, are substantially the width of the channel of the rim, and side motion of said springs is prevented by the sides of the channel. Said leaf springs may consist of one or more leaves and each spring extends substantially in a tangential direction from said rim 4. The end of the outer leaf of each spring is bent outward, as illustrated, and is apertured and adapted to receive one of the bolts 7. Each of the springs 8 is so arranged that the outer apertured end thereof extends between the lugs 6' of one of said pairs, and each bolt 7 extends through one of the helical springs 9 and through the outer apertured end of said spring 8, and through the adjacent pair of apertured lugs. This form of wheel may be used upon all axles of a vehicle, but it is particularly advantageous as a driver wheel for automobiles. When so employed the wheels are mounted upon the vehicle so as to travel in the direction shown by the arrow in Fig. 1.

By referring to the drawing it will be seen that when power is applied to the wheel the felly 3 of the wheel will tend to move relatively to the tread band and the ends of the springs 8 will compress the coiled springs 9 and thus protect the motive power from shocks incident to starting a vehicle.

While I have shown the preferred form of my invention I desire it to be understood that certain modifications may be made therein without departing from the spirit and scope of my invention.

What I claim as new is:

In a resilient wheel, a felly, a rim secured to the felly, a metallic tread band disposed concentrically around the rim, pairs of apertured lugs fixed to the inner surface of the tread band, leaf springs secured to and extending tangentially from the rim and having radially extending apertured ends, a helical spring seated against the apertured end of each leaf spring and extending beyond said end and abutting against a lug of one of said pairs for holding said lug and apertured end in spaced relation and holding said apertured end normally in contiguity with the other lug of said pair, and a bolt seated in the apertures of each pair of lugs and extending through the contiguous helical spring and through the contiguous apertured leaf spring end.

In testimony whereof I have signed my name to this specification in the presence of two subscribing witnesses.

GEORGE D. MINNICK.

Witnesses:
F. E. BRITTON,
T. A. WILLIS.

Copies of this patent may be obtained for five cents each, by addressing the "Commissioner of Patents, Washington, D. C."